Sept. 6, 1960  J. V. HUGHES ET AL  2,951,638
GAS PUMPING SYSTEM ANALOG

Filed May 31, 1955  5 Sheets-Sheet 1

JOHN V. HUGHES
WILLIAM L. ROLLWITZ
INVENTORS

BY Browning, Simms & Hyer
ATTORNEYS

JOHN V. HUGHES
WILLIAM L. ROLLWITZ
INVENTORS

ATTORNEYS

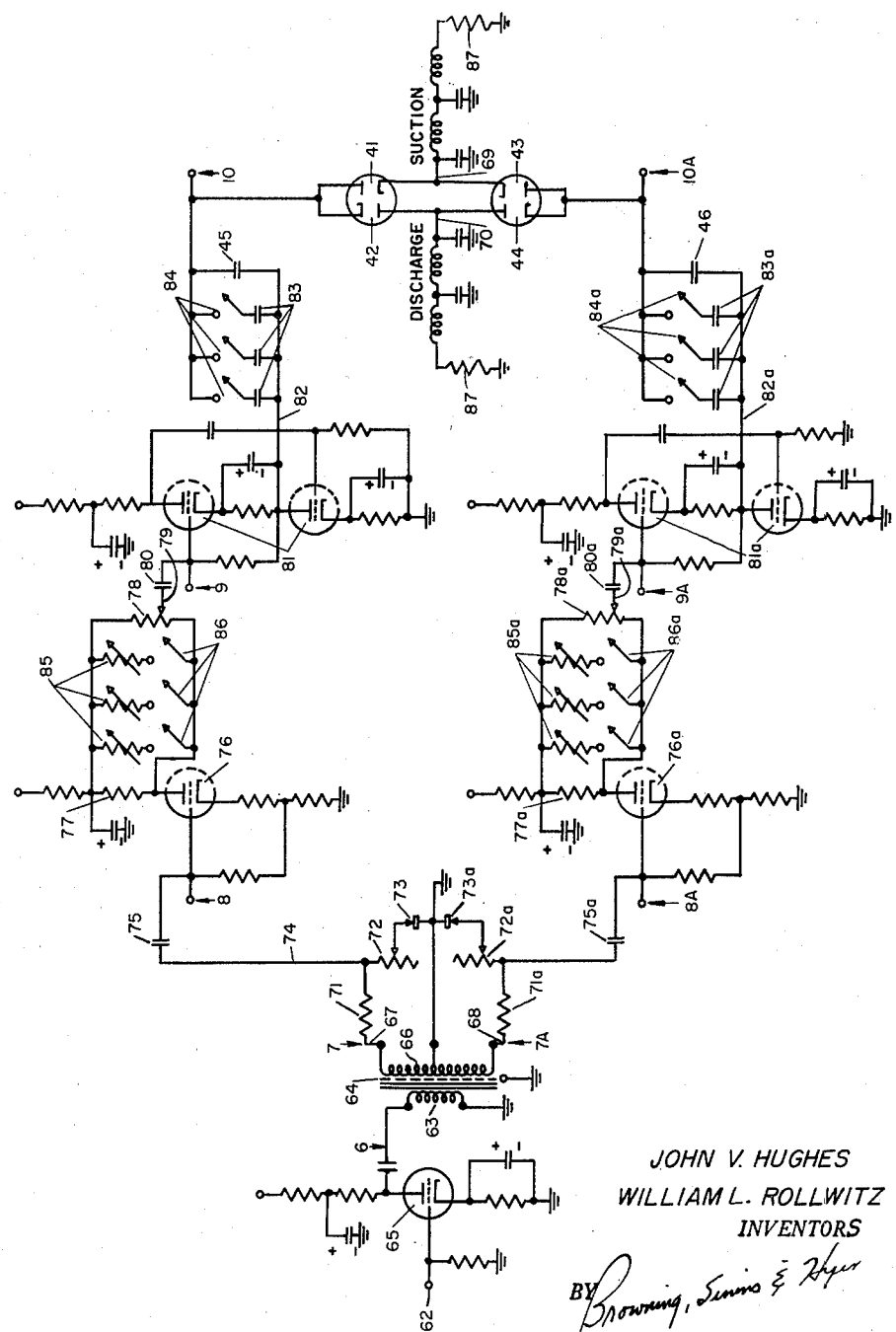

JOHN V. HUGHES
WILLIAM L. ROLLWITZ
INVENTORS

JOHN V. HUGHES
WILLIAM L. ROLLWITZ
INVENTORS

ATTORNEYS

United States Patent Office

2,951,638
Patented Sept. 6, 1960

2,951,638

GAS PUMPING SYSTEM ANALOG

John V. Hughes, Merton Park, London, England, and William L. Rollwitz, San Antonio, Tex., assignors to Southern Gas Association, Dallas, Tex., a corporation Filed May 31, 1955, Ser. No. 512,262

20 Claims. (Cl. 235—183)

This invention relates to a simulator which is an electrical analog of a gas compressor or pumping system. In one of its aspects, it relates to an electrical analog of a reciprocating piston type gas compressor. In another of its aspects, the invention relates to an improved phase changer and to a frequency stable oscillator having a plurality of outputs of predetermined difference in phase. In still another of its aspects, the invention relates to an improved modulator for changing the relative amplitudes of the two half cycles of an alternating current.

The compression or pumping of gases is known to result in undesirable pulsation phenomena. Thus, the conventional piston type gas compressor inherently operates in such a manner that gas flows into and out of the compressor in pulses of limited duration but with very high mass rate of flow during each pulse. This pulsing action is reflected through the compressor suction and discharge piping system and is the cause of many ill effects including: (1) fatigue failure of the piping; (2) erroneous gas measurements; (3) reduction in volumetric efficiency of the compressor; (4) increase in power required to pump the gas; and (5) compressor valve failure.

The undesirable effects of pulsative flow are particularly accentuated when, as is not infrequently the case, the fundamental or a harmonic of the pressure wave set up by the intermittent intake and discharge of gas is in resonance with the natural frequency of all or a part of the gas piping system. Accordingly, the minimum objective to be obtained in designing any piping system is to provide lengths and sizes of pipes and other conduits such that this resonance is avoided. Another and more complete manner of avoiding the ill effects of pulsative flow is to eliminate or smooth the pulses into a steady flow by means of acoustic filters.

However, serious obstacles are encountered in designing either non-resonant piping systems or acoustic filters for use with a reciprocating type compressor. First, the calculative procedure for even a single acting compressor is time consuming and burdensome. Second, the speed of the compressor, the number of pockets employed, the suction and discharge pressure may vary widely so that separate calculations must be made for a large number of combinations and permutations of variables. Third, it is usual to employ a plurality of double acting compressor units, as well as a plurality of cylinders for each compressor, in a common piping system. Each end of each cylinder will contribute its own individual pulsative flow and pressure wave to the piping system at a particular frequency. Inasmuch as there exists a difference between the crank angles of the various cylinders, a variance between the speeds of the various compressors, the pockets in use on each cylinder, the suction and discharge pressures, it is easily seen that the frequency and amplitude of the pulses of flow and of the gas pressure waves generated by the many cylinders can assume any number of complex shapes which are varied each time an operating variable is changed. Mathematical calculation of piping and acoustic filter systems under these circumstances becomes economically prohibitive.

To permit the proper design of compressor piping systems and filters as well as to afford a means for studying the effect of changes in operating and design variables on gas pumping systems in general, it has been recognized that there is a need for an electrical analog of a compressor and piping system to provide a flexible and rapidly operable means for studying gas pumping systems under a variety of conditions. It is therefore a general object of this invention to provide a simulator which is an electrical analog of a gas pumping system and in which provision is made to simulate the effect of each of the variable parameters of the pumping system upon the other parameters so as to produce a substantially complete analog of the pumping system in operation.

Another object is to provide an electrical pumping system analog in which the various electrical parameters, such as voltage, current flow, etc., are individually the analogs and representative of individual corresponding parameters of the gas pumping system, such as pressure, gas flow, etc.

Another object of the invention is to provide an electrical network which is an analog of a gas pumping system so that it can be utilized to predict the effect of changing various operating and acoustic conditions in the gas pumping system.

Another object is to provide such an analog having components each representing by analogy a parameter of a gas pumping system and which are so interrelated that an electrical value of one component can be varied in a manner directly analogous to a variation of the pumping system parameter represented by such component in order to study the effect of such variation on the pumping system, all without making compensating adjustments in the other parameter components of the analog.

Another object is to provide a pumping system analog in which the various qualities of a gas as they exist at any point in a pumping system are simulated by corresponding electrical qualities at corresponding points in the analog so that a measurement of one or more of the electrical qualities as they exist at any of the points in the analog permits a simple determination of the corresponding gas quality in the pumping system.

Another object is to provide an electrical pumping system analog in which the electrical dimensions of electrical components correspond to the acoustic dimensions of the acoustic elements of the gas pumping system and wherein the effect of such electrical components on the various electrical qualities as they exist in the analog are analogous to the effect of the acoustic elements upon the corresponding acoustic qualities of the gas so that changes in an electrical component can be made to study the effect of a corresponding change in the corresponding acoustical element of the gas pumping system.

Another object of the invention is to provide an electrical analog of a gas pumping system in which a voltage and current flow substantially identically simulates the change in pressure in and the flow of gas through a compressor cylinder and which can be employed in the simulation of the effect of suction and discharge piping on such pressure change and gas flow through the compressor cylinder.

Another object is to provide an electrical analog of a gas pumping system in which one or more electrical components can be provided to be individually varied or rendered effective and ineffective to individually study the effect of compressor speed variations, crank angle variations, variations in cylinder volume (by pocket operation), suction and discharge valve opening and closing variations, suction and discharge pressure variations, and changes in flow conduit sizes, lengths and points of connection.

Another object is to provide an electrical analog of a gas compressor in which a current storage means is employed to cause pulses of current to flow from a low potential (suction) to a high potential (discharge) source to simulate the action of a compressor, by applying an alternating potential to the storage means of a character that the pulsing current flow simulates the pulsing gas flow caused by the compressor.

Another object is to provide such an analog in which the character of the alternating potential is readily variable in a manner as to cause the pulsing current flow to reflect simulated changes in compressor speed, pocket volume, crank angle differences between various cylinders and the like.

Another object is to provide such an analog simulating a double acting compressor cylinder or a plurality of such cylinders powered by a common prime mover.

Another object is to provide such an analog in combination with an analog of a gas flow conduit system comprising a plurality of lumped electrical impedances connected to simulate the distributed acoustical impedance of the conduit system whereby the relationship between the acoustical properties of a flow conduit and the operation of a compressor can be studied.

Another object is to provide an improved phase angle adjuster particularly adapted for use in such a gas pumping system analog to analogously vary the crank angles between various cylinders but which is also susceptible of general use as a phase adjuster.

Another object is to provide variable frequency oscillator circuit having two outputs of predetermined difference in phase angle which difference is maintained through a broad band of oscillator frequencies.

Another object is to provide an improved amplitude modulator likewise particularly useful in such an analog but finding other uses wherein it is desired to controllably vary the amplitude ratio of the positive and negative half-cycles of an alternating current.

Other objects, advantages and features of the invention will be apparent to one skilled in the art upon consideration of the written specification, the appended claims and the attached drawings wherein:

Fig. 4 is a circuit diagram illustrating an analog of a double acting compressor;

Figure 12:
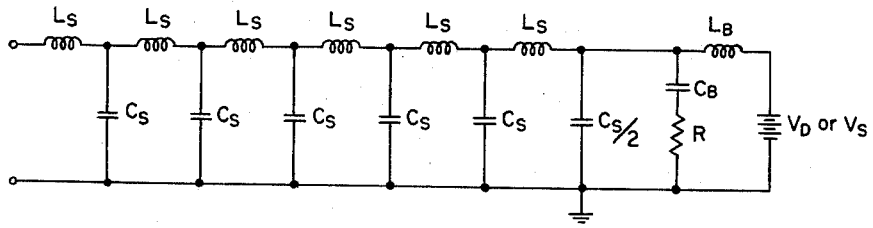
Figure 10:
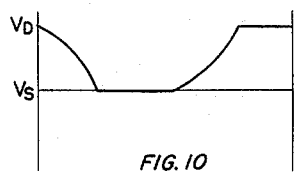
Figure 10A:
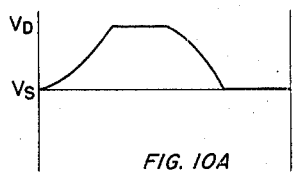
Figure 11:
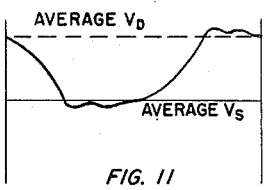

Figs. 10 and 10A illustrate ideal voltage wave shapes as would occur at points 10 and 10A in Fig. 4 where there is no transmission line impedance connected to the capacitor pump (e.g. the pump is connected at its input and output to infinitely large capacitances) and represents the pressure variations in one end of a compressor cylinder operating under conditions of no suction or discharge conduit flow resistance;

Fig. 11 is similar to Fig. 10 except it represents a typical voltage wave shape as it occurs in point 10 of Fig. 4 with input and output line impedances connected to the capacitor pump to simulate gas flow conduits; and Fig. 12 is a circuit diagram of a delay line representing by analogy the flow conduits of the gas pumping system.

THE ANALOGY

Before proceeding with a detailed explanation of the subject matter of the drawings, it should be pointed out that the analogy between the passage of an acoustic wave in a body of gas and the passage of an electric wave along a transmission line, is obtained by comparison of the partial differential equations governing these two cases. These equations can be set up in a number of equivalent forms, depending on the variables chosen for study, and a corresponding number of analogies can be set up. Table I gives some of the possible analogies which have been considered. It has been found convenient in the analog described here to use analogy C in order to simplify the circuits involved, but the others can be used with suitable circuit modifications.

Table I

| Electrical factor | Corresponding acoustical factor | | | |
|---|---|---|---|---|
| | Analogy A | Analogy B | Analogy C | Analogy D |
| V | $p$ | $v$ | $p$ | M |
| I | $v$ | $p$ | M | $p$ |
| L | $\rho/A$ | $A/B$ | $1/A$ | $A\rho/B$ |
| C | $A/B$ | $\rho/A$ | $A\rho/B$ | $1/A$ |

$V$ = voltage across the electrical line at any specified point.
$I$ = current flowing in the electrical line at any specified point.
$L$ = inductance per unit length, for a continuous electrical line, or per section, for an artificial transmission line.
$C$ = capacitance per unit length, for a continuous electrical line, or per section, for an artificial transmission line.
$p$ = excess pressure of the gas, due to pulsations, above the normal (static) pressure, at any specified point in the pipe.
$v$ = volume of gas passing any specified cross-section of the pipe per second, due to the acoustic wave.
M = mass of gas passing any specified cross-section of the pipe per second, due to the acoustic wave.
$A$ = cross-sectional area of the pipe.
$B$ = bulk modulus of the gas.
$\rho$ = density of the gas.

Thus, in accordance with this invention, the following analogies are maintained between the parameters of the analog and those of the gas pumping system:

(1) The electrical voltage corresponds to gas pressure, the direct current voltage corresponding to the static pressure of the gas and the alternating voltage corresponding to the pulsating gas pressure.

(2) The electrical current corresponds to mass flow of gas both as to absolute quantity and rate. Here again the direct current flow corresponds to the steady mass flow of gas and the alternating current flow to the pulsating mass flow of gas.

(3) The electrical frequency corresponds to the acoustic frequency. The frequency of the alternating current is determined as a known multiple of the frequency of the gas pulsations and this relationship is maintained for all electrical and acoustical frequencies of the electrical and acoustical waves.

(4) The electrical wave velocity corresponds to the velocity of sound in the gas.

(5) The electrical dimensions of the analog components correspond to the mechanical dimensions of the acoustic elements in the gas pumping system. For example, the electrical reactance of an electrical wave filter component corresponds to a predetermined length of pipe of given diameter such that the acoustic impedance of such pipe length in turn corresponds to the electrical impedance of the filter component.

(6) The controls for the analog correspond closely to the controls for the gas pumping system.

(7) The phase angle between the various voltage and current waves in the analog correspond respectively to the phase angle between the various pressure and pulsing gas flow waves in the gas pumping system.

In accordance with this invention, the electrical analog is so arranged that the gas pumping system variables and determinants including compressor speeds, crank angles between various cylinders, suction and discharge pressures and temperatures, piston displacement, pocket volumes and the length and size of the flow conduits and their points of interconnection are set up by adjusting various electrical components of the analog. Thereafter, the pressure and flow conditions at various points throughout the pumping system are substantially simulated at corresponding points in the analog. Any change in one or more of the analog components to reflect a change in the corresponding variable or determinant of the pumping system will cause the analog to reflect the pressure and flow conditions as they would exist in the changed pumping system.

Thus, it is possible, for example, to change the electrical frequency to simulate the effect of a change in compressor speed, to change the electrical phase angle to simulate the effect of a change in compressor crank angles, to change voltages to simulate the effect of a change in suction or discharge pressure, to change a capacitance to simulate a change in cylinder volume, to change an alternating potential wave shape to simulate different time intervals that the compressor valves remain open, and to change a line impedance to simulate a change in gas temperature or of conduit size or length. Each of these changes can be accomplished individually and their electrical effect will be reflected throughout the analog in the same manner as a corresponding change in the gas pumping system would be reflected throughout such system. Accordingly, it can be seen that the analog truly simulates a gas compression system and its mode of operation.

THE GAS PUMPING SYSTEM

Figure 1:
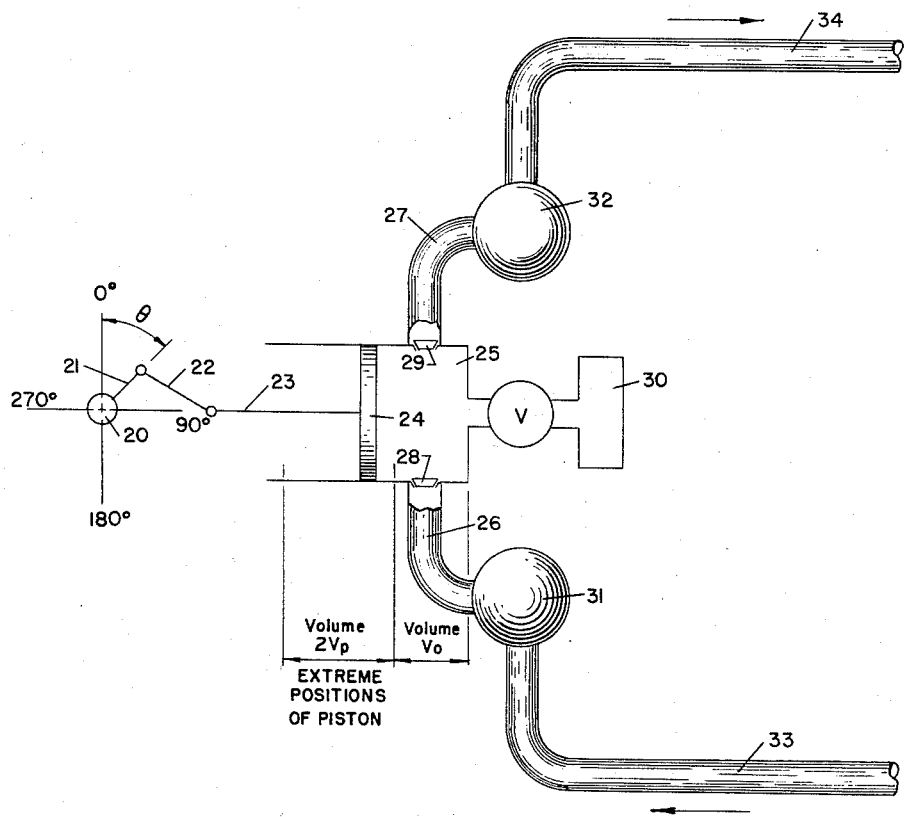
Fig. 1 is a schematic representation illustrating one element at a gas pumping system for which this invention can provide an electrical analog.

Referring to Fig. 1, the illustrated single acting compressor includes a prime mover, which is schematically indicated by input shaft 20, a crank 21, a connecting rod 22 which is connected via piston rod 23 to a piston 24. As the piston is reciprocated in cylinder 25, it draws gas from suction nozzle 26 and discharges it through discharge nozzle 27. The usual suction and discharge valves 28 and 29 are provided and a pocket 30 has been shown schematically. The piping system is shown as including suction and discharge headers 31 and 32 and flow pipes 33 and 34.

Of course, the compressors now in use are commonly double acting and have a plurality of cylinders driven by a common prime mover. The pistons of a single compressor are usually staggered in operation so that they begin their strokes at different times and this difference in time is measured by the "crank angle." Also, it is common for the cylinders of one or more compressors to be connected to common suction and discharge manifolds. In this description and claims unless otherwise indicated, the term "cylinder" will be used to denote a single end of an actual compressor cylinder.

THE ANALOG OF THE COMPRESSOR

The compressor analog generally comprises the following functional components:

(1) A means for producing an alternating current having a frequency of predetermined relationship to the frequency of the piston's movement through a complete suction and discharge cycle. This piston frequency is termed "compressor speed" hereinafter since the revolutions per second of the compressor drive shaft 20 is equal to or a multiple of the piston frequency.

(2) Means for producing, from the output of component (1), a number of alternating currents having a predetermined difference in phase angle therebetween equal respecitvely to the difference in crank angle between the various cylinders. This means is not required where only one cylinder of a compressor is being simulated.

(3) Means for adjusting the wave shape of the output of component (2) (or component (1) where a component (2) is not used).

(4) A means for causing pulses of current to individually flow from a low potential (suction) source, then to be stored for an interval and thereafter discharged to a high potential source (discharge). This means is illustrated herein as a capacitor pump.

THE CAPACITOR PUMP

Figure 2:
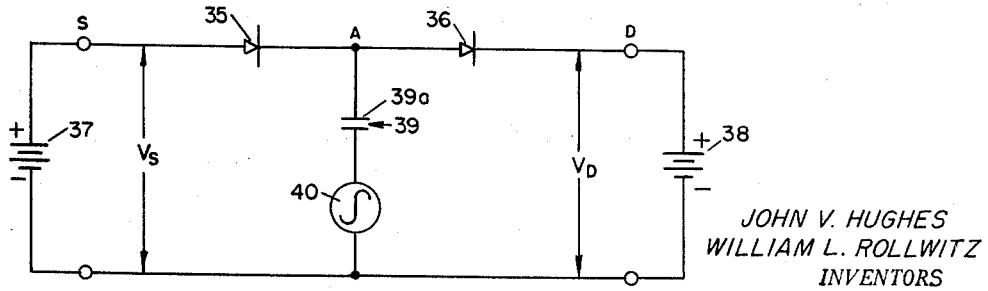
Fig. 2 is a schematic circuit diagram illustrating a capacitor pump employed to simulate one end of a compressor cylinder.

In Fig. 2, a typical capacitor pump is illustrated as comprising circuit means limiting current flow to be from a low potential toward a high potential source such as a circuit including a pair of rectifiers 35 and 36 which form a part of a series circuit between a low potential source 37 and a high potential source 38. These sources are such as to provide direct current potentials $V_s$ and $V_D$ respectively simulating the average static compressor suction pressure and the average static compressor discharge pressure. The rectifiers then simulate the action of the compressor suction and discharge valves respectively. To simulate the compressor cylinder, an energy storage means such as capacitance 39 is connected in T-section with the rectifier circuit to a point between the rectifiers. Into one side of this capacitance is fed an alternating potential wave from source 40 which wave simulates the crankshaft driving the piston and is so shaped as to vary the potential applied across the capacitance to the rectifier circuit to cause the rectifiers to alternately become conductive and non-conductive for predetermined intervals simulating the opening and closing of the compressor suction and discharge valves and the flow of gas therethrough.

Figure 3A:
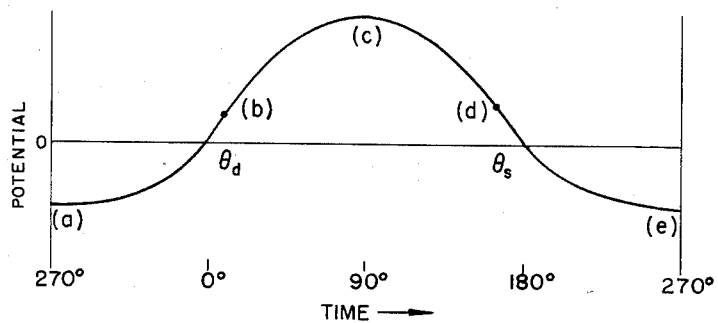
Fig. 3A is a graphical representation of the output potential wave applied to the capacitor pump of Fig. 2.

In explaining the operation of the capacitor pump, assume a starting point in the cycle at which the potential of point A (Fig. 2) is slightly greater than that at S, and the alternating potential has just started to increase from its negative peak (point (a) in Fig. 3A). Under these conditions, rectifier 35 prevents backflow of current to source 37 and the potential across rectifier 36 is not great enough to cause it to fire. As a result, plate $39a$ is isolated from both potential sources 37 and 38. The charge on capacitor 39, and the potential difference across the capacitor will remain constant as long as the rectifiers remain non-conducting.

As the potential from source 40 rises, so does the potential of plate $39a$, maintaining the potential difference across capacitance 39 constant, until the potential at point A becomes equal to or slightly exceeds that at point D. At this instant, rectifier 36 becomes conducting. As the potential from source 40 rises further, charge flows from plate $39a$ into the discharge side of the transmission line to high potential source 38 at a sufficient rate to hold the potential at point A at, or very slightly above the potential of point D. This flow of charge from capacitance 39 into the discharge side transmission line continues until the potential from source 40 reaches its maximum value.

As soon as the potential from source 40 begins to fall from its positive peak value, the potential at point A similarly falls and rectifier 36 becomes non-conducting. As the potential from source 40 continues to fall, the charge on capacitance 39 and the potential difference thereacross remain constant, and the potential of point A falls in unison with that of source 40. As soon as the potential at point A becomes equal to or slightly less than that of point S, rectifier 35 becomes conducting and the capacitance starts charging. As the potential at A continues to fall with that of source 40, charge flows from the suction-side of the transmission line in just sufficient amount to hold the potential at point A at, or very slightly below, that of point S. As soon as the potential of source 40 reaches its minimum negative peak value, rectifier 35 becomes non-conducting and the cycle is repeated.

Figure 3B:
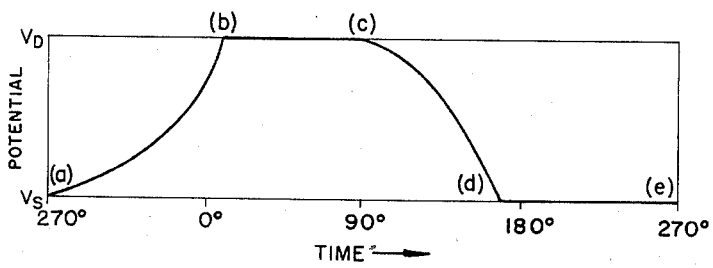
Fig. 3B is a graphical representation of the electrical potential of point A in the capacitor pump circuit of Fig. 2 upon applying an alternating potential of the nature shown in Fig. 3A.

The operation of the capacitor pump is illustrated in the potential versus time plots of Figs. 3A and 3B. In Fig. 3A, the output potential of source 40 is plotted while in Fig. 3B, the potential of point A of Fig. 2 is plotted. At point (a) on these graphs, the potential from source 40 has just commenced to rise from its minimum value and the potential of point A likewise has commenced to rise. This is analogous to the piston of a compressor beginning its discharge stroke to compress the gas trapped in the cylinder from the suction to the discharge pressure. At point (b), the capacitance commences to discharge through rectifier 36 and the (b)—(c) portion of the curve represents the portion of the compressor cycle during which gas is discharged through the open discharge valves. As soon as the potential from source 40 commences to fall (point (c)), the potential at point A also begins to fall and this decrease in potential at point A represents the expansion of gas in the cylinder between the time the piston begins its suction stroke and the time the suction valves open. At point (d) on the curves, the condenser begins to charge by drawing current from low potential source 37 in analogy to the compressor opening its suction valve and drawing gas into its cylinder. At point (e), the increase in potential of point (a) again begins to rise and the cycle is completed.

It will thus be seen that the action of the capacitor pump in causing current flow precisely duplicates a compressor in its pumping action on a gas and that the charge on the capacitance and its charging and discharging rates are analogous to the mass and mass flow rate of gas handled by the compressor. Thus, the capacitor pump is constructed to operate in accordance with the following formula $$q = K(M_1 - M_2)$$

where $q$ is the charge transferred from the low potential source to the high potential source each cycle of the alternating voltage, $K$ is a constant, $M_1$ is the mass of gas in the compressor cylinder with the piston at the end of its suction stroke and $M_2$ is the mass of gas in the cylinder with the piston at the end of its discharge stroke.

It will also be seen that the sinusoidal input wave from source 40 is applied at point A in a manner such that portions (a)—(b) and (c)—(d) of the curve for point A substantially duplicate the adiabatic compression and expansion curves for a gas in a compressor cylinder.

*Wave shaping.*—In the operation of a piston-type compressor, the piston movement causes a mass of gas to flow into the cylinder from the suction nozzle during the (d) to (e) portion of the piston cycle as shown in Fig. 3B. During the (b) to (c) portion of the piston cycle, an equal mass of gas is discharged into the discharge nozzle. Since the gas is compressed during the (a) to (b) cycle portion, the volume of gas discharged is always less than that sucked into the cylinder.

Thus, referring to Fig. 1, it can be seen that the volume V of gas trapped in the cylinder at any crank angle $\theta$ is approximated by $$V = (V_0 + V_p) - V_p \sin \theta \quad (1)$$

where $V_p$ is one-half the displacement volume of the piston and $V_0$ is the clearance volume including that of any open pockets.

If the discharge valve 29 opens at crank angle $\theta_d$, then the angle from $\theta_d$ to 90° represents the angle of crank movement during which gas is discharged. For any crank angle $\theta_1$ between $\theta_d$ and 90°, the volume $V_d$ of gas which has been discharged is represented by $$V_d = V_p (\sin \theta_1 - \sin \theta_d) \quad (2)$$

Similarly, if the suction valve 28 opens at a crank angle $\theta_s$, then gas flows into the cylinder while the crank is moving from $\theta_s$ to 270°. For any angle $\theta_{11}$ between $\theta_s$ and 270°, the volume $V_s$ of gas which has flowed into the cylinder is given by $$V_s = -V_p (\sin \theta_{11} - \sin \theta_s) \quad (3)$$

The total volume $V_{dt}$ discharged per stroke is equal to $V_p(1 - \sin \theta_d)$ and the total volume $V_{st}$ moving into the cylinder during the piston's suction stroke is equal to $V_p(1 + \sin \theta_s)$. As stated, the mass of gas transferred per piston cycle must be constant but since the volume relationship must be $$V_{dt} < V_{st}$$

or $$V_p(1 - \sin \theta_d) < V_p(1 + \sin \theta_s) \quad (4)$$

then it can be seen that the angle $\theta_s$ to 270° must be greater than the angle $\theta_d$ to 90° and the mass rate of gas passing into and out of the cylinder should be a sinusoidal function.

In accordance with this invention, the source 40 is so constructed and arranged as to apply an alternating potential wave to capacitance 39 of such magnitude that the positive and negative peak potentials of the wave respectively are greater and lesser than potentials of low and high potential sources 37 and 38 in order to cause the rectifiers 35 and 36 to alternately become conducting and non-conducting. The source is also constructed and arranged so that its output potential wave has a shape or form such that rectifier 35 is rendered conducting for a longer period of time than is rectifier 36 so as to simulate the action of compressor suction valves remaining open for a longer time than the compressor discharge valve. Also, the wave shape is preferably sinusoidal in shape, particularly those portions effective during the periods when the rectifiers are conducting so that the rate of current flow during such periods is likewise sinusoidal to approximate Formula 4 above. This shaping of the potential wave can be satisfactorily accomplished best by making the positive half of the output potential wave from source 40 of greater amplitude than the negative half so that the rate of flow of charge through rectifier 36 during the (b) to (c) portion of the cycle is greater than the rate of flow through rectifier 35 during the (d) to (e) portion of the cycle whereby rectifier 36 is rendered conductive for a shorter period of time ($\theta_d$ to 90°) than is rectifier 35 ($\theta_s$ to 270°) thereby simulating the mass flow and pressure cycles of a compressor. Stated in another manner, the amplitude ratio of the positive half of the potential wave from source 40 and the negative half of such wave and the peak to peak amplitude of the potential wave are adjusted so that rectifiers 35 and 36 are rendered conducting through respective phase angles equal to the compressor crank angles during which the discharge and suction valves remain open and also to simulate the different mass flow rates of gas through the suction and discharge valves. Then by regulating the frequency of source 40 to be proportional to the compressor speed, the frequency at which rectifiers 35 and 36 are rendered conductive and non-conductive will be made proportional to the frequency of opening and closing of the suction and discharge valves. Accordingly, the frequency, sequence and time intervals of operation of the compressor suction and discharge valves are simulated.

ANALOG OF A DOUBLE ACTING COMPRESSOR

A circuit diagram for an analog simulating a double acting compressor is illustrated in Fig. 4. This diagram taken with that of Fig. 5, the latter circuit supplying the input to the Fig. 4 circuit, embodies all of the elements of the capacitor pump of Fig. 2. However in the Fig. 4 diagram, the elements of Fig. 2 have been partially duplicated in parallel and other elements added to afford a simulation of the double acting compressor. Thus, rectifiers 35 and 36 are here shown as diodes 41 and 42 to simulate the suction and discharge valves of the head end of the cylinder while diodes 43 and 44 represent the crank end suction and discharge valves. Capacitance 39 is shown as condensers 45 and 46. The remainder of the circuit in Fig. 4 as well as that of Fig. 5 comprises a preferred embodiment of source 40 and will now be described in detail.

Figure 5:
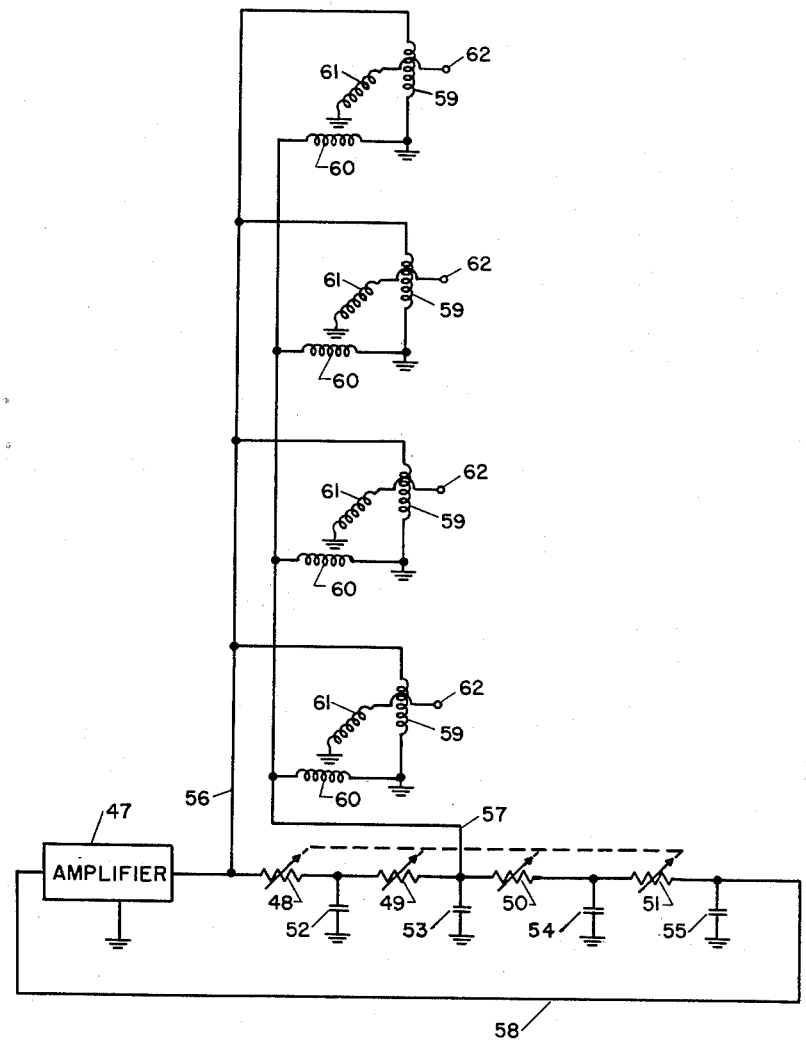
Fig. 5 illustrates a circuit diagram of an improved phase angle adjuster constructed in accordance with this invention and which supplies the input to the circuit of Fig. 4.

While an analog of only one single acting or double acting cylinder requires only one alternating current, the simulation of a plurality of cylinders for one or more compressors requires a plurality of alternating currents and the phase angles between these various currents are adjusted to reflect the difference in crank angles between the various cylinders. Further, the frequency of the various currents employed in simulating a single compressor should be variable without any relative phase angle change to permit simulation of varying compressor speeds. The circuit of Fig. 5 is adapted to provide such a set of currents. In this figure, an amplifier 47 has a plurality of phase shifting impedances in its output in the form of series resistances 48 to 51 and line to ground capacitances 52 to 55. Resistances 48 and 49 and capacitances 52 and 53 are proportioned to cause a predetermined change in phase angle (preferably 90°) of the output in flowing thereacross so that by connecting conductors 56 and 57 to the output on either side of this group of impedances, two alternating currents of predetermined difference in phase angle are provided as outputs. Resistances 50 and 51 and capacitances 54 and 55 are proportioned to further cause a phase shift (preferably 90°) in the output to provide feedback, via conductor 58, of suitable phase for causing the amplifier to oscillate.

Resistances 48 to 51 are made to be variable and preferably are ganged together so that their values can be changed to regulate the output frequency of the amplifier. It is important to note that the output frequency can be varied without causing any variation in phase angle between the currents in conductors 56 and 57. In this manner, an adjustably variable frequency oscillator provides at least two output currents of constant difference in phase angle and the withdrawal of varying amounts of these output currents does not alter the oscillator frequency or the phase angle between the currents.

The output currents from the oscillator are fed into a plurality of phase changers so that the output of the latter provides the alternating currents of different phase relationships as required for the different cylinder analogs. Thus in Fig. 5, the tuned circuit is arranged so that conductors 56 and 57 tap off currents differing 90° in phase. These are then fed into legs 59 and 60 of the phase changers so that pickup coils 61 can be rotated relative to the legs to provide outputs at 62 having any desired phase angle relative to each other. It is then a simple matter to regulate the angularity of coils 61 to the crank angles of the various compressor cylinders to be simulated.

Figure 6:
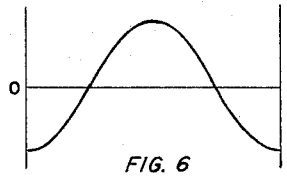
Figs. 6, 7, 7A, 8, 8A, 9 and 9A illustrate the voltage wave shape at the correspondingly numbered points in the circuit of Fig. 4.

Returning now to Fig. 4, this circuit simulates one double acting compressor cylinder and it will be understood that a plurality of these circuits can be employed to simulate an entire compressor simply by hooking each circuit to separate ones of the outputs 62 of the phase adjuster-oscillator circuits. These outputs are fed into the primary 63 of a transformer 64 via an isolating or coupling amplifier 65. The secondary 66 of the transformer is center-tapped to ground so that the outputs in conductors 67 and 68 are 180° out of phase with each other. In this manner, means are provided for dividing the oscillator and phase changer sine wave output (Fig. 6) into two currents 180° out of phase (Figs. 7 and 7A) to simulate the opposing movements of the piston rod in reciprocating the piston. Then by maintaining the phase difference between these two currents at 180° as they are respectively applied through capacitances 45 and 46 to diodes 41—42 and 43—44, the flow of current from the suction transmission line 69 to discharge transmission line 70 will exactly simulate the 180° out-of-phase flow caused by the head and crank ends of a double acting cylinder.

Since the parallel halves of the circuit between conductors 67 and 68 and capacitances 45 and 46, respectively, are identical, only one half will be described in detail and the suffix "a" added for the corresponding components of the other half.

As before indicated, means are provided for adjusting the magnitude of one-half of the potential wave to be fed to the capacitance 45 relative to that of the other half so as to thereby adjust the ratio of the amplitudes of the halves. This adjustment determines the ratio of firing times of diodes 41 and 42 and hence is employed to simulate the difference in time the compressor suction and discharge valves remain open as explained above.

In accordance with this invention, a new and improved amplitude modulator is provided for this purpose. Thus, resistance 71 is connected in series with the output of transformer 64 while a variable resistance 72 and a rectifier 73 are connected in series with each other and between line and ground. Rectifier 73 is shown as being inserted in the circuit to offer little resistance to current to flow to ground but to offer a very large resistance to current flow from ground. Each of resistances 71 and 72 are made considerably smaller in value than the resistance to back flow through the rectifier and considerably larger than the resistance to forward flow through the rectifier. Then as a positive half wave of potential is applied across the resistances to ground, its amplitude at the point where output conductor 74 connects between resistances 71 and 72 will be reduced below that of the positive half of the input wave in conductor 67. The degree of reduction in amplitude can be adjusted by varying resistance 72. Then as the negative half wave is applied, its amplitude remains substantially unchanged. Expressed mathematically, $$e_o = e_i \left( \frac{R_{72} + R_o}{R_{71} + R_{72} + R_o} \right) \text{ for the positive half cycle}$$

$$e_o = e_i \left( \frac{R_{72} + R_i}{R_{71} + R_{72} + R_i} \right) \text{ for the negative half cycle}$$

where $e_o$ and $e_i$ are the corresponding positive and negative peak voltages of the input and output, respectively, $R_{71}$ and $R_{72}$ are the values of resistances 71 and 72, and $R_o$ and $R_i$ are the apparent resistances of rectifier 73 in the direction toward and the direction away from ground, respectively. Then since $R_o$ is very small relative to $R_{71}$ and $R_{72}$, the output amplitude of the positive potential half wave is determined primarily by the voltage divider effect of $R_{71}$ and $R_{72}$. On the other hand $R_i$ is very large compared to $R_{71}$ and $R_{72}$ so that the output amplitude of the negative potential half wave is determined substantially by $R_i$. It can thus be seen that variations in $R_{72}$ will exert a considerably greater effect on the amplitude of the positive half cycle than on that of the negative half cycle. In effect then, rectifier 73 acts as a "switch" to place a large resistance in one leg of a voltage divider during one half of the potential cycle and to remove such resistance during the other half of the cycle.

Figure 8:
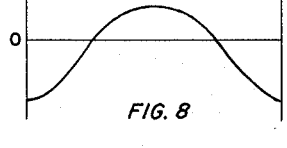
Figure 8A:
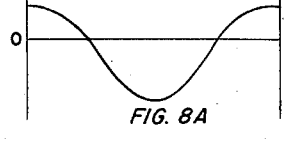

If desired, the rectifier can be inserted to limit flow to ground so that the negative half cycle will be reduced more in amplitude than the positive half. In either case, it is merely necessary to vary the value of resistance 72 to adjust the ratio of positive and negative half cycle amplitudes. This adjustment of ratio is illustrated in Figs. 8 and 8A.

Figure 9:
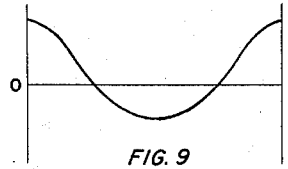
Figure 9A:
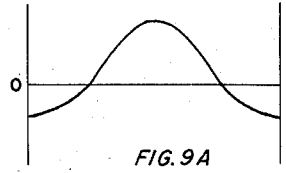

The amplitude modulator is coupled by a condenser 75 to an amplifier 76 where the voltage wave is amplified and its phase reversed as shown in Figs. 9 and 9A. The amplifier plate circuit includes resistances 77 and 78 which are in parallel so that the portion of the amplified potential wave is developed across resistance 78. A variable tap 79 is employed to pick off the peak-to-peak amplitude of the potential wave which is to be applied to condenser 45. Thus, resistance 72 is variable to determine the ratio of positive to negative peak potential amplitudes and tap 79 is variable to determine the peak-to-peak amplitude of the voltage wave.

Tap 79 is coupled through capacitance 80 to a cascode circuit 81 which provides a low impedance source for capacitance 45 with no phase inversion and can operate satisfactorily with a wide grid swing. The output of circuit 81 is connected via conductor 82 to one plate of capacitance 45 to complete the compressor analog circuit when pocket volumes are not considered.

As indicated in Fig. 1, compressor cylinders are frequently provided with one or more pockets which are opened and closed to control the operational characteristics of the compressor. To simulate the effect of opening and closing of pockets, the circuit of Fig. 4 is provided with capacitances 83 adapted to be switched into parallel with capacitance 45 by means of switches 84. Each of the capacitances simulates the volume of a compressor pocket so that when switched into the circuit, the total effective cylinder volume is simulated by the capacitance of condenser 45 plus the capacitances of the pocket condenser.

However, when a pocket capacitance is added to the circuit, it is necessary to decrease the peak-to-peak amplitude of the potential wave applied to the total capacitance in order to simulate the decreased rate of mass transfer of gas and the shorter periods during which the compressor suction and discharge valves are open as a result of opening a pocket. To do this, a plurality of resistances 85, one for each of capacitances 84, are provided in the plate circuit of amplifier 76 in parallel with resistances 77 and 78. Upon switching one of resistances 85 into the circuit by closing one of switches 86, the amplification of amplifier 76 is reduced to thereby reduce the peak-to-peak potential of the wave tapped off by tap 79. Accordingly, the shorter opening periods of the compressor valves and the smaller volume of gas pumped upon opening a pocket is thereby simulated. Preferably corresponding ones of switches 84 and 86 are ganged in pairs so that a single motion will adjust the compressor analog to reflect opening or closing of a pocket.

GAS TRANSMISSION CONDUIT ANALOG

In accordance with this invention, the gas transmission conduits, including piping, nozzles, acoustic filters and the like, are simulated by providing delay lines each comprising a plurality of lumped impedance units connected in series to reflect the distributed acoustic impedance of the gas conduits. Each unit is composed of an electrical inductance and capacitance connected in L-section so as to represent the lumped acoustic inductance and capacitance of a unit length of conduit of predetermined diameter containing a gas of given specific gravity and temperature.

Thus referring to Fig. 12, each unit comprises an inductance $L_s$ and a capacitance $C_s$. The units are interconnected so that all the inductances $L_s$ are in series in the line and capacitances $C_s$ are connected from line to ground. By forming the units so that they can plug into each other or by providing switches therebetween, any number of units can be coupled together to represent a desired length of conduit.

In order to simulate the dying out of gas pulsations in a long length of line, the electrical delay lines are terminated by a resistance $R_0$ connected from line to ground to prevent reflected potential waves. Resistance 87 has a value equal to the characteristic impedance of each delay line as defined by $$R = \sqrt{\frac{L_s}{C_s}}$$

The resistances $R_0$ are connected to the delay lines at the latter's termini most remote from the capacitor pump. Further potential sources 37 and 38 (shown in Fig. 12 as $V_d$ or $V_s$) are also connected at these termini to apply a constant direct current voltage simulating the average static suction and discharge gas pressures of the compressor. To effect these connections, a choke $L_B$ is connected in series with the direct current potential source to prevent current pulsations from being applied to such source and resistance $R_0$ is connected in series with a large capacitance $C_B$ which prevents the direct current from leaking to ground through resistance $R_0$ while permitting alternating current to be applied thereto. As indicated in Fig. 12, the final capacitance in the delay line should be one half the value of the other capacitances.

It will be understood that separate delay lines of the nature shown in Fig. 12 are connected to the suction and discharge transmission lines as indicated in Fig. 4 where a single cylinder double acting compressor is being simulated. Where a plural cylinder compressor is simulated, a sufficient number of the $L_s$—$C_s$ units of Fig. 12 are employed to simulate the suction and discharge nozzles of each cylinder and then these nozzle units are connected into another group of $L_s$—$C_s$ units simulating common discharge and suction headers. Additional $L_s$—$C_s$ units are connected in series with the header units to simulate the desired length of pipeline and the pipe line units each terminate in the $V_d$—$V_s$, $R_0$, $C_B$ and $L_B$ arrangement of Fig. 12.

OPERATION OF SYSTEM ANALOG

*Design parameters*—As indicated above, the electrical qualities which correspond to the acoustic qualities have been chosen as follows:

| Electrical Quality | Corresponding Acoustical Quality |
| --- | --- |
| V (voltage) | P (gas pressure). |
| I (current) | M (mass rate of gas flow). |
| L (inductance) | 1/A (reciprocal of cross-sectional area of pipe). |
| C (capacitance) | $A\rho/B$ ($\rho$ is density of gas, B is bulk modulus of gas). |

Four design parameters, $\alpha$, $\beta$, $\gamma$ and $\delta$ need be chosen to determine the magnitudes of the electrical qualities deemed convenient for the analog. Once these four parameters are chosen, then the relations between the other qualities become fixed by such choice. The four parameters can be defined as:

$$\alpha = \frac{P}{V} \quad (5)$$

$$\beta = \frac{M}{I} \quad (6)$$

$$\gamma = \frac{a_s}{a_e} \quad (7)$$

$$\delta = \frac{f_s}{f_e} \quad (8)$$

where $a_e$ and $a_s$ are respectively the velocity of electrical waves in a conductor and the velocity of sound waves in a gas and where $f_e$ and $f_s$ are the respective frequencies of the electrical and sound waves. The relations between the other qualities, which are determined by the values of the four design parameters, are:

$$L = \left(\frac{\beta\gamma}{\alpha}\right)\frac{1}{A} \quad (9)$$

$$C = \left(\frac{\alpha\gamma}{\beta}\right)\frac{A}{B}\cdot\rho \quad (10)$$

$$k = \gamma \cdot \delta \quad (11)$$

where $k$ is the length of pipe represented by one $L_s$—$C_s$ unit of the delay line.

There are, of course, many possible methods of selecting the parameters and the following is exemplary:

(1) Choose a value of V which can be used in the delay lines without danger to personnel and yet which will be easy to work with. A voltage of 10 to 100 volts is usually satisfactory. Once this voltage is chosen, the value of $\alpha$ can be calculated since the gas pressure is known.

(2) The compressor analog should be constructed to operate at a frequency sufficiently high that the size of capacitance 39 and of the inductances and capacitances in the delay lines can be maintained reasonably small. A convenient range of frequency for the system is 1 to 10 kilocycles per second. When this value is selected, $\delta$ is fixed.

(3) In determining $\gamma$, $k$ is first fixed. In so doing, consideration must be given to the fact that the delay lines must each comprise a sufficient number of LC units to truly simulate a length of pipe. It has been found desirable to employ at least one hundred LC units to represent a satisfactory delay line at the lowest possible fundamental acoustic wave length. To determine this lowest fundamental wave length, the upper limit of the fundamental frequency is first determined. The upper limit is then divided into the velocity of sound in the gas to obtain the lower limit of fundamental wave length of gas pulsations in the pipe. A convenient value of $k$ is now chosen so that $k$ is less than one per cent of the lower limit of the fundamental wave length. Then even the tenth harmonic of the fundamental frequency will be represented by ten LC units which is of the order of a desired minimum number to insure the delay line simulates a gas transmission line. Once $k$ is so selected, $\gamma$ can be easily calculated.

(4) The equations for L and C can now be solved and, in so doing, a value of $\beta$ is arbitrarily selected to give reasonable L and C values. From the assumed $\beta$, the rate of flow of gas represented by each unit of I can be calculated.

Accordingly, it can be seen that a plurality of units each having a lumped electrical inductance and capacitance representing a unit length of gas flow conduit can be assembled into a delay line. Further, the delay line is caused to simulate the distributed acoustic inductance and capacitance of the entire gas flow conduit by maintaining each unit of the delay line to be only a small fraction of the wave length of the highest frequency present in the pulsation wave being studied.

After the delay lines have been determined as above, the compressor simulator can be adjusted to simulate the compressor which is to pump gas through the flow conduits represented by the delay lines.

Thus, the capacitance $C_p$ of each of capacitors 45 and 46 can be calculated from $$C_p = \left(\frac{\alpha\delta}{\beta}\right) \cdot \frac{V_m}{RT_s} \cdot \frac{K^{\frac{1}{n}}-1}{K-1} \qquad (12)$$

where $V_m$ is the volume of gas in the cylinder with the piston at mid-stroke, $T_s$ is the absolute suction temperature, R is the gas constant, K is the compression ratio and $n$ is adiabatic coefficient of the gas. Typical values of $$\frac{K^{\frac{1}{n}}-1}{K-1}$$

are:

Compression ratio:

| | $\frac{K^{\frac{1}{n}}-1}{K-1}$ |
|---|---|
| 1.0 | 0.8 |
| 2.0 | 0.74 |
| 3.0 | 0.705 |
| 4.0 | 0.677 | for gases having a ratio of specific heats of 1.25.

The values of the pocket capacitances can be calculated from the same formula as $C_p$ merely by substitution of the values of the pocket volumes for $V_m$.

In adjusting the wave form of the alternating potential to be applied to capacitors 45 and 46, resistances 72 and 72a are adjusted to give the desired ratio of negative ($A^-$) to positive ($A^+$) amplitudes and taps 79 and 79a adjusted to give the desired peak-to-peak amplitude. The amplitude ratio required can be calculated from $$\frac{A^-}{A^+} = \frac{1-K(8)}{1+K(8)} \qquad (13)$$

and the peak-to-peak amplitude (2a) from $$2a = 2K(7)\frac{P_d}{\alpha}\frac{V_s}{V_m} \qquad (14)$$

where $V_s$ is half the piston displacement volume, $P_d$ the discharge pressure and K(7) and K(8) are functions of the compression ratio having the following typical values:

| Compression Ratio | K(7) | K(8) |
|---|---|---|
| 1.0 | 1.25 | 0 |
| 2.0 | 0.93 | 0.27 |
| 3.0 | 0.80 | 0.42 |
| 4.0 | 0.75 | 0.51 | for gases having a specific heat ratio of 1.25.

The peak-to-peak amplitudes for operation with one or more of the ganged pairs of switches 84 and 86 closed to simulate the opening of compressor pockets can be adjusted by adjusting resistances 85 to give the desired peak-to-peak amplitude with the particular switch closed. Such peak-to-peak amplitude can be calculated from Formula 14 merely by adding the volume of the pocket to $V_m$ and then solving.

In using the analog as thus constructed, voltage wave forms can be observed at various points in the delay lines by cathode-ray oscilloscope, a voltmeter or other convenient means. The effect of compressor pulsations can be studied as changes are made in the piping system by varying points of interconnection of various conduits, their diameters and lengths, etc. Acoustic filters can be simulated in the delay lines by choosing suitable LC units therefor and the efficiency of the filters in dampening pulsations studied. In this connection, it should be noted that the studies of the piping and filter systems thus made will inherently disclose any passbands at particular frequencies generated by the compressor, by beat frequencies or by harmonics of the compressor's fundamental frequency. The system can be simulated for all conceivable compressor operating conditions and this can be accomplished with acceptable accuracy and very rapidly. Thus the delay lines can be rapidly altered to reflect various piping conditions and the compressor analog operation can be studied to indicate critical pulsation conditions and means to avoid the same.

After the analog study has been made, the intelligence thus gained can be converted for use in designing the actual acoustical system by using the formulas above set forth to determine specific pipe and vessel sizes, locations, lengths, and the like. If some extraneous factor, such as size limitations at a compressor station, make the design unacceptable, it is a simple matter to arrive at a new design compatible with specific station conditions.

Further, the efficiencies of compressors in any particular pumping environment can be studied by means of the instant analog. Thus, with the circuit shown in Fig. 4, and without any delay lines, typical pressure and flow conditions (Figs. 10 and 10A) as they exist in a compressor not influenced by varying back pressure conditions in a flow conduit system can be studied. More important, the operation of any particular compressor when connected to a particular piping installation can be studied to improve its efficiency such as by reducing the adverse effects of acoustical reflectances on the suction and exhaust valves and the like. Thus, as shown in Fig. 11, the acoustical effect of gas flow conduits on the pressure conditions in a compressor cylinder are simulated by the instant analog as indicated by the erratic wave form above $V_d$ and below $V_s$. The pressure waves thus existing during suction and discharge from a cylinder are clearly indicative of the effect of piping arrangements on the compressor and it is possible to use the analog to arrange the piping so that these waves are reduced to a minimum amplitude thereby increasing the efficiency of the compressor operation.

While the specification and claims refer to "compressors" and "suction and discharge valves and lines," etc., it is to be understood that these terms are intended to include the use of this invention to simulate internal combustion engines with their intake and exhaust valves and mufflers, etc., and other acoustic wave generators and systems analogous to gas compressors and the systems employing the same.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An analog for electrically simulating the effect of a compressor on a gas stream which comprises, in combination, means providing first and second current sources respectively at a low and a high potential simulating the suction and discharge pressures of a compressor, a circuit including first and second rectifiers connected in series between said sources and limiting current flow to be from the low potential to the high potential source to thereby simulate compressor valves, a capacitance connected to form a T-section with said rectifiers to simulate a compressor cylinder, an alternating potential source in series with said capacitance and of a frequency simulating the piston frequency of the compressor piston, the alternating potential having negative and positive peak potentials respectively sufficiently lesser and greater than the potentials of said first and second current sources that when applied to said capacitance, the capacitance is charged through said first rectifier responsive to the alternating potential falling below that of said first current source to simulate the suction of gas into said compressor cylinder and is discharged through said second rectifier responsive to the alternating potential exceeding that of said second current source to simulate the discharge of gas from said compressor cylinder, and means for shaping the voltage wave of said alternating potential source.

2. The analog of claim 1 in combination with means for adjusting the peak to peak potential of said potential wave.

3. The analog of claim 1 in combination with an electrical delay line connected in said circuit and electrically simulating the flow of compressed gas through a discharge conduit.

4. The analog of claim 5 in combination with an electrical delay line connected in said circuit and electrically simulating the flow of gas through a suction conduit.

5. The analog of claim 4 wherein said delay lines comprise a plurality of readily interconnectible units each representing the lumped impedance of a unit length of said conduit and when interconnected closely simulating the distributed impedance of a conduit comprising a plurality of said unit lengths.

6. An analog for electrically simulating a condition as it exists in a gas pumping system which comprises, in combination: transmission means comprising electrical delay lines electrically simulating a gas flow conduit and including a plurality of units in series with each such unit representing the lumped impedance of a length of said conduit; means for applying a potential difference across said transmission means to simulate a pressure differential along said conduit; and current pumping means in series with said transmission means including means limiting electric current to flow through the transmission means only in the direction of increased potential therealong, energy storage means connected in T-section with the current limiting means so that upon the potential of the energy storage means falling below that at the low potential end of the transmission means energy will be stored in the energy storage means and upon the potential of the energy storage means rising above that at the high potential end of the transmission means energy will flow from the energy storage means to the transmission means, means for applying a varying potential to said energy storage means and causing it to fluctuate in potential to be above and below the end potentials applied to said transmission means by said potential applying means thereby alternately charging and discharging said storage means, and means for controlling the potential so applied to cause the discharge rate of said storage means to be greater than its charge rate to thereby simulate the sequence of opening and closing of compressor discharge and suction valves.

7. An analog for electrically simulating a condition as it exists in a gas pumping system which comprises, in combination: transmission means including electrical delay lines electrically simulating a gas flow conduit and including a plurality of units in series with each such unit representing the lumped impedance of a length of said conduit; means for applying a potential difference across said transmission means to simulate a pressure differential along said conduit; and current pumping means in series with said transmission means including means limiting electric current to flow through the transmission means only in the direction of increased potential therealong, energy storage means arranged to be charged from the transmission means upon the storage means falling in potential to be less than that at the low potential end of the transmission means and to discharge into the transmission means upon the storage means rising in potential to be above that at the high potential end of the transmission means, and means for applying a varying potential to said energy storage means and causing it to fluctuate in potential to be above and below the end potentials applied to said transmission means by said potential applying means thereby alternating charging and discharging said storage means.

8. An analog for electrically simulating a condition as it exists in a gas pumping system which comprises, in combination, an electrical transmission circuit simulating a gas flow conduit and including a plurality of electrical components representing the acoustical impedance of the conduit, means for applying a potential difference across said transmission circuit to simulate a pressure differential along said conduit, first and second rectifiers in said transmission circuit to limit current flow to be only in the direction of increasing potential along said transmission circuit, a capacitance having one side connected to a point between said rectifiers to simulate a compressor cylinder, and an alternating potential source in series with said capacitance to simulate the action of a compressor piston, said capacitance being of a size and said alternating potential having positive and negative amplitudes of such magnitude that the potential applied to said transmission circuit across the capacitance exceeds that required to cause current flow through the second rectifier through a phase angle of the potential wave equal to the compressor crank angle through which the compressor discharge valve is open and falls below the potential required to cause current flow through the first rectifier through a phase angle of the potential wave equal to the compressor crank angle through which the suction valve is open.

9. The analog of claim 8 in combination with means for varying the ratio of the positive to the negative peak amplitudes of the alternating potential and the peak to peak value thereof so as to simulate the suction valve of a compressor remaining open for a longer period than the discharge valve.

10. An analog for electrically simulating the effect of a pump on a gas stream which comprises, in combination, circuit means including means therein limiting flow of electrical energy to be from a low to a high potential source to electrically simulate gas flow from the suction to the discharge of a gas pump, current storage means connected to said circuit means intermediate the ends of the latter to receive electrical energy from the low potential source and then to discharge such energy to the high potential source thereby simulating the pumping action of said pump, an alternating potential source providing a potential wave having a peak to peak amplitude exceeding the potential difference between said potential sources, and wave shaping means connecting said source to the energy storage means and shaping the potential wave applied to the energy storage to have portions of increasing and decreasing potential respectively greater and lesser than those of said high and low potential sources for a cycle time equal to the compressor cycle time the compressor discharge and suction valves are open.

11. The analog of claim 10 wherein said wave shaping means includes a circuit for varying the ratio between the positive and negative peak amplitudes of said potential wave.

12. The analog of claim 11 wherein said wave shaping means includes a variable impedance for varying the peak to peak potential of said potential wave.

13. The analog of claim 10 wherein said circuit means includes a plurality of lumped impedances each simulating the lumped acoustic impedance of a predetermined length of gas flow conduit and together simulating distributed acoustic impedance of said conduit.

14. The analog of claim 13 wherein said lumped impedances are selected so that the length of conduit represented by each impedance is of the order of ten percent of the wave-length of the highest acoustic frequency to be simulated and studied.

15. An analog for electrically simulating the effect of a compressor on a gas stream which comprises, in combination, circuit means including means therein limiting current flow to be from a low to a high potential source to electrically simulate gas flow through a gas compressor system, a first capacitance connected to said circuit means intermediate the latter's ends to receive current from the low potential source and then to discharge such current to the high potential source to simulate the action of a compressor cylinder, means for generating an alternating potential wave having a determined ratio of positive and negative peak potentials, a circuit including an impedance connecting said generating means to said circuit means in series with said first capacitance, a second capacitance connected in parallel across the first capacitance to simulate a pocket volume of a compressor, a second impedance connected in parallel across the first impedance, and switch means for rendering said second impedance and second capacitance effective and ineffective to simulate the opening and closing of a compressor pocket.

16. An analog for electrically simulating the effect of a compressor on a gas stream which comprises, in combination, circuit means including means therein limiting current flow to be from a low to a high potential source to electrically simulate gas flow through a compressor gas system, a first capacitance connected to said circuit means intermediate the latter's ends to receive current from the low potential source and then to discharge such current to the high potential source to simulate the action of a compressor cylinder, means for generating an alternating potential wave having a determined ratio of positive and negative peak potentials, a circuit connecting said generating means to said circuit means in series with said first capacitance including a second capacitance in parallel to the first capacitance to simulate a pocket volume of a compressor and an impedance for varying the peak to peak potential of said alternating potential wave, and means for selectively connecting and disconnecting said second capacitance and impedance in said circuit to simulate the opening and closing of a compressor pocket.

17. An analog for electrically simulating the effect of a compressor on a gas stream which comprises, in combination, circuit means including means limiting flow of current to be from a low to a high potential source to electrically simulate gas flow through a compressor gas system, variable capacitance means connected to said circuit means intermediate the latter's ends to receive current therefrom from said low potential source and then to discharge such current back to the circuit means for flow to the high potential source to simulate the variable volume of a compressor cylinder having pockets, an alternating potential source with an output voltage wave having a determined difference in positive and negative peak amplitudes, and a circuit connecting said source in series with said variable capacitance means including a variable impedance for varying the peak to peak potential of the voltage wave applied to said variable capacitance means to simulate the varying periods during which the compressor suction and discharge valves remain open as the variable capacitance means is changed in value to simulate opening and closing of compressor pockets.

18. An analog for electrically simulating the effect of a compressor having a plurality of cylinders on a gas stream which comprises, in combination, circuit means for causing pulses of currents to individually flow from a low potential source, then stored for an interval of time and thereafter to flow to a high potential source responsive to the application of an alternating potential wave to the circuit means of predetermined magnitude and shape to simulate the pumping action of a gas compressor, one of such circuit means being provided for each cylinder to be simulated, a source of alternating potential, a plurality of branch circuits connecting said source to each of said circuit means, each such branch including a phase adjusting means for varying the phase relationship of the potential wave in one branch circuit relative to the waves in the other branch circuits to thereby simulate the difference in crank angles among the various cylinders, and a common electrical delay line connected to the circuit means to electrically simulate the flow of gas through a conduit under the influence of a plurality of compressor cylinders common to such conduit.

19. The analog of claim 18 wherein each of the branch circuits includes means for shaping the potential wave applied to the circuit means connected to such branch means to be such that the phase angle of the potential wave through which the pulse is stored equals the crank angle of the compressor through which both the suction and discharge valves are closed and gas is being compressed.

20. An analog for electrically simulating the effect of a double acting compressor on a gas stream which comprises, in combination, circuit means for causing pulses of current to individually flow from a low potential source, then stored for an interval of time and thereafter to flow to a high potential source responsive to the application of an alternating potential wave to the circuit means of predetermined magnitude and shape to simulate the action of a cylinder, one of such circuit means being provided for the head end of the cylinder and another for the crank end, a source of alternating potential, a circuit connecting said source to each of said circuit means and including a phase shifter for shifting the phase of the potential wave applied to one of said circuit means to be 180 degrees out of phase with the potential wave applied to the other circuit means, and a common electrical delay line connected to the circuit means to simulate the flow of gas through a conduit.

References Cited in the file of this patent

UNITED STATES PATENTS

| | | |
|---|---|---|
| 2,241,595 | Guanella | May 13, 1941 |
| 2,345,712 | Mohr | Apr. 4, 1944 |
| 2,564,682 | Fisk et al. | Apr. 21, 1951 |
| 2,576,499 | Bowes | Nov. 27, 1951 |
| 2,661,898 | Bubb | Dec. 8, 1953 |
| 2,695,750 | Kayan | Nov. 30, 1954 |
| 2,775,714 | Curtis | Dec. 25, 1956 |

OTHER REFERENCES

Waveforms (Chance et al.), published by McGraw-Hill Book Co., New York, 1949, page 286 relied on. Pages 54 and 55 of interest.

Figure 7:
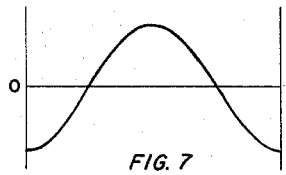
Figure 7A:
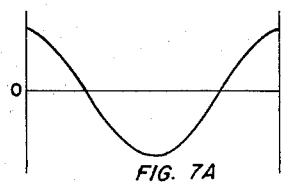

Electron-Tube Circuits (Seely), published by McGraw-Hill Book Co., New York, 1950, page 126, figures 7-5.